United States Patent
Medina et al.

(10) Patent No.: US 9,912,526 B2
(45) Date of Patent: Mar. 6, 2018

(54) SYSTEM AND METHOD FOR REPLACING MEDIA CONTENT

(71) Applicant: AT&T INTELLECTUAL PROPERTY I, LP, Atlanta, GA (US)

(72) Inventors: Douglas Medina, Grain Valley, MO (US); Todd Andrew Fryer, Liberty, MO (US); Nicholas Nicas, Blue Springs, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 135 days.

(21) Appl. No.: 14/919,373

(22) Filed: Oct. 21, 2015

(65) Prior Publication Data

US 2017/0118064 A1    Apr. 27, 2017

(51) Int. Cl.
| | |
|---|---|
| H04L 12/26 | (2006.01) |
| H04L 12/24 | (2006.01) |
| H04B 7/185 | (2006.01) |
| H04L 12/861 | (2013.01) |

(52) U.S. Cl.
CPC ......... *H04L 41/0654* (2013.01); *H04B 7/185* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 6,640,239 | B1 | 10/2003 | Gidwani |
| 6,944,133 | B2 | 9/2005 | Wisner et al. |
| 7,552,213 | B2 | 6/2009 | De Oliveira et al. |
| 7,900,230 | B2 | 3/2011 | James et al. |
| 8,381,250 | B2 | 2/2013 | Tjio et al. |
| 8,571,464 | B2 | 10/2013 | Norin et al. |

(Continued)

FOREIGN PATENT DOCUMENTS

JP    5336627 B2    11/2013

OTHER PUBLICATIONS

"Cisco Catalyst 3550 Series Intelligent Ethernet Switches," Cisco, cisco.com, accessed: Aug. 2015. http://www.cisco.com/c/en/us/products/collateral/switches/catalyst3550seriesswitches/product_data_sheet09186a00800913d7.html.

(Continued)

*Primary Examiner* — Minh-Trang Nguyen
(74) *Attorney, Agent, or Firm* — Guntin & Gust, PLC; Ralph Trementozzi (57) ABSTRACT

Aspects of the subject disclosure may include, for example, determining a first tuning state of a media processor of a subscriber. The first tuning state includes a satellite service channel of a number of channels, wherein the satellite service channel provides a first media content item that is processed by the media processor for presentation. A terrestrial service channel is identified that provides a second media content item. The terrestrial service channel is accessed, but not at a time of access processed by the media processing device for presentation. An unavailability is determined of the satellite service channel to the media processor, and subsequent processing of the second media content item by the media processor is facilitated by replacing the first media content item, responsive to the determining of the unavailability of the satellite service channel. Other embodiments are disclosed.

20 Claims, 7 Drawing Sheets

(56) References Cited

U.S. PATENT DOCUMENTS

| | | | |
|---|---|---|---|
| 9,535,158 B1* | 1/2017 | Breiholz | G01S 13/953 |
| 2002/0090942 A1* | 7/2002 | Karabinis | H04B 7/18563 |
| | | | 455/427 |
| 2006/0105787 A1* | 5/2006 | Seo | G08G 1/096716 |
| | | | 455/456.5 |
| 2010/0049824 A1 | 2/2010 | Hu et al. | |
| 2010/0229205 A1 | 9/2010 | Hakusui et al. | |
| 2010/0313232 A1 | 12/2010 | Norin et al. | |
| 2011/0296472 A1 | 12/2011 | Soldan et al. | |
| 2013/0332565 A1 | 12/2013 | Wang et al. | |
| 2014/0194145 A1* | 7/2014 | Do | G01S 5/0252 |
| | | | 455/456.3 |
| 2014/0273859 A1 | 9/2014 | Luna et al. | |
| 2014/0359057 A1 | 12/2014 | Hensgen | |
| 2016/0191913 A1* | 6/2016 | Martch | H04N 17/004 |
| | | | 348/189 |

OTHER PUBLICATIONS

"Network Performance Monitor (NPM)" Solarwind, GovSmart, govsmart.com, ©2015, accessed: Aug. 2015. http://www.govsmart.com/solarwinds/.

\* cited by examiner

SYSTEM AND METHOD FOR REPLACING MEDIA CONTENT

FIELD OF THE DISCLOSURE

The subject disclosure relates to automated media content replacement.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for an intelligent multi-switch that reacts to an impairment in reception of original media content from a satellite and/or terrestrial media feed by applying substitute media content from another source, such as a corresponding Internet feed. The multi-switch can also react to a resumption in availability of the original media content by returning to the satellite/terrestrial feed. The multi-switch can be IP enabled and include discrete signal detection to accurately predict impairments to received media content services. Other embodiments are described in the subject disclosure.

One or more aspects of the subject disclosure include a system including a switch, a processor in communication with the switch and a memory that stores executable instruction. The instructions, when executed by the processor, facilitate performance of operations that include receiving a channel indicator of a media processing device of a subscriber. The channel indicator corresponds to a satellite service channel of a number of satellite service channels, wherein the satellite service channel provides a first version of a media content item processed by the media processing device for presentation. A terrestrial service channel of a number of terrestrial service channels is identified, that presents a second version of the media content item. Unavailability of the satellite service channel to the media processing device is detected. The switch is controlled to the terrestrial service channel of the number of terrestrial service channels, wherein the second version of the media content item is not, prior to the controlling of the switch, processed by the media processing device for presentation. Subsequent processing of the second version of the media content item by the media processing device is facilitated by replacing the first version, responsive to the detecting of the unavailability of the satellite service channel.

One or more aspects of the subject disclosure include a process that detects, by a device comprising a processor, a first tuning state of a media processing device of a subscriber. The first tuning state includes a satellite service channel of a number of satellite service channels, wherein the satellite service channel presents a media content item. The media content item is presented to the media processing device. A terrestrial service channel of a number of terrestrial service channels is determined that provides a substitute media content item. The terrestrial service channel of the number of terrestrial service channels is accessed. An unavailability of the satellite service channel to the media processing device of the subscriber is detected and subsequent processing of the substitute media content item by the media processing device is facilitated by replacing the media content item, responsive to the detecting of the unavailability of the satellite service channel.

One or more aspects of the subject disclosure include a machine-readable storage medium, having executable instructions that, when executed by a processor, facilitate performance of operations. The operations include determining a first tuning state of a media processing device of a subscriber, wherein the first tuning state includes a satellite service channel of a number of satellite service channels, wherein the satellite service channel presents a first media content item. The first media content item is processed by the media processing device for presentation. A terrestrial service channel of a number of terrestrial service channels is identified that provides a second media content item. The terrestrial service channel of the number of terrestrial service channels is accessed, wherein the second media content item is not initially processed by the media processing device for presentation. An unavailability of the satellite service channel to the media processing device is determined and facilitation of subsequent processing of the second media content item by the media processing device by replacing the first media content item, responsive to the determining of the unavailability of the satellite service channel.

Figure 1:
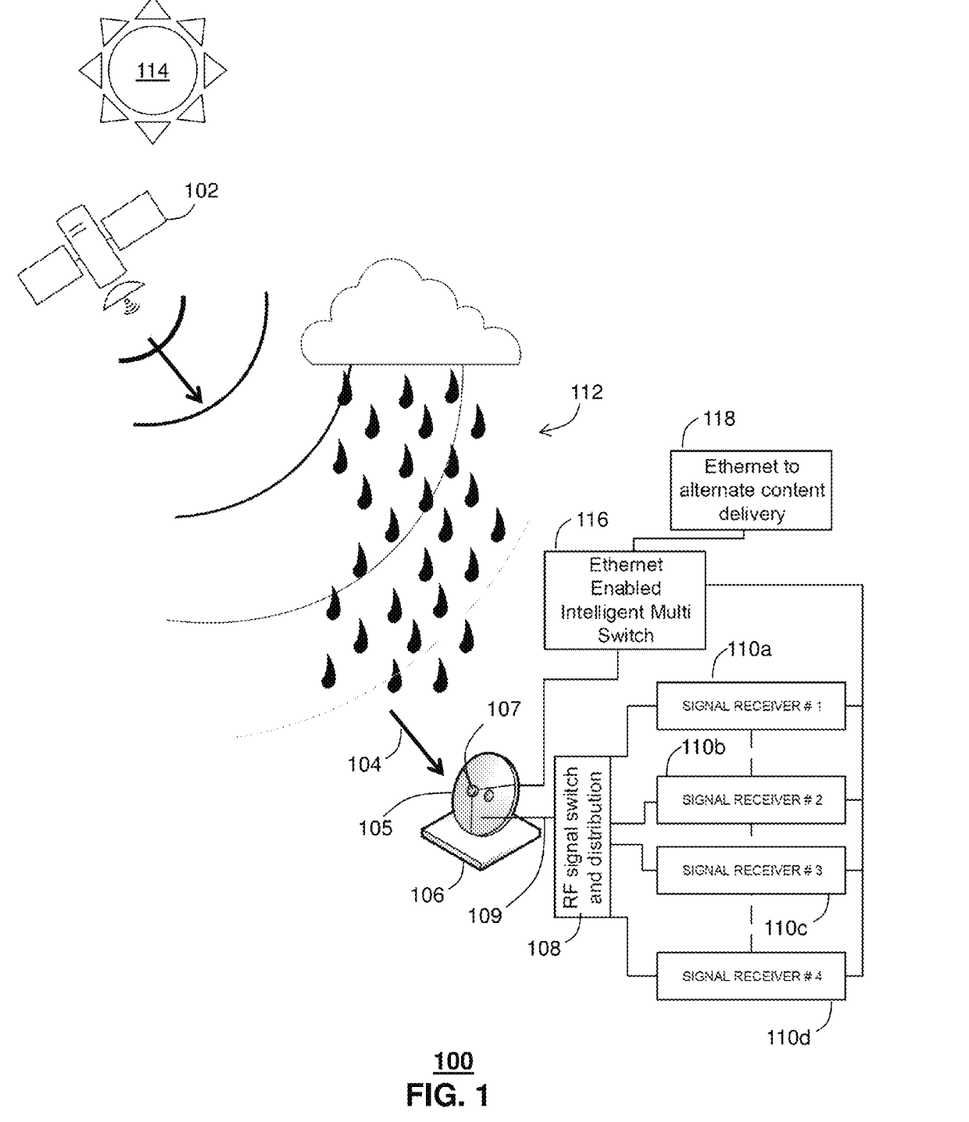
FIG. 1 depicts an illustrative embodiment of a direct broadcast satellite system.

FIG. 1 depicts an illustrative embodiment of a Direct Broadcast Satellite (DBS) system 100, sometimes referred to as a Broadcasting Satellite Service (BSS). The system 100 includes one or more artificial satellites 102 providing satellite service to one or more geographical regions. Each satellite 102 includes one or more transponders that transmit satellite service signals 104 wirelessly to the target geographical region(s). Under certain conditions, the satellite signals 104 can be received by a satellite terminal 106. Namely, the satellite terminal 106 is positioned within a target geographical region, without interference that might otherwise degrade or prevent reception of the satellite signal 104. By way of non-limiting example, DirecTV® and Dish Network®, are American DBS service providers. They transmit digital satellite television and audio to households and businesses in the U.S., Latin America and the Caribbean. DBS is also considered a direct competitor of cable television providers. DirecTV® and Dish Network® are registered trademarks of DirecTV, LLC and Dish Network LLC, respectively. These providers emit their core programming from satellite in geostationary orbits at locations between 100 W and 120 W western longitudes.

One such means of interference is related to the sun 114. The satellite terminal 106 typically has a highly directional antenna that is aimed at a location of the satellite 102. Under certain astronomical conditions, the sun may fall within the same region covered by the satellite terminal 106 antenna. Namely, the satellite falls on a line connecting the satellite antenna and the sun. This can be referred to as sun fade, sun transit, sun outage or solar conjunction. Such conditions can occur multiple times per year, for a period of about several minutes or more during which reception of the satellite signal is impeded, degraded or otherwise unavailable. In some instances, e.g., depending upon antenna mis-pointing, link margin, actual element performance and so forth, the durations of any single outage can be greater than 10 minutes. Fortunately, sun fade can be predicted with a high degree of precision based on locations of the satellite 102 and the satellite terminal 106. Sun interference prediction calculators are readily available, such as a calculator available online from INTELSAT, at http://www.intelsat.com/tools-resources/satellite-data-tools/sun-interference-calculator/.

It is generally understood that adverse weather conditions can also affect the quality of satellite signal reception. For example, heavy rains 112 can attenuate the satellite signal enough to result in noticeable degradation of image quality. In extreme cases, the reception can be effectively disrupted. Satellite signal reception quality also can be affected by water or snow/ice accumulating over the surface of the satellite terminal antenna.

In more detail, the satellite terminal 106 includes a satellite dish antenna 105 and a low-noise amplifier/block down-converter (LNB) 107. The dish antenna 105 is typically mounted external to a subscriber's premises and receives RF signals 104 from one or more satellites. The received satellite signals 104 are passed to the LNB 107, and an amplified, filtered and down-converted, e.g., removing an RF carrier. The down-converted signals 109 are provided to a satellite receiver, typically within the subscriber's premises. Some premises can include multiple receivers or set-top boxes (STBs) 110a, 110b, 110c, 110d (generally 110) receiving the down-converted signals 109 from an RF distribution device.

If the satellite terminal 106 provides a single output, the RF distribution device can include an RF splitter. More typically, the satellite terminal 106 provides multiple outputs. In the illustrative example, a multi-switch 108 is provided to route the down-converted signals to the appropriate STB 110. It is generally understood that the same dish antenna can receive satellite signals 104 from more than one satellite. Alternatively or in addition, the same premises can have more than one satellite antennas, e.g., pointing to different satellites and/or operating in different frequency bands. In such situations, each of the inputs of the multi-switch 108 is dedicated to a respective one of the received satellite signals 104. In some embodiments, one of the inputs of the multi-switch can receive inputs from a terrestrial antenna, e.g., receiving a local terrestrial wireless broadcast of television programming. For example, a "3 In-4 Out" multi-switch can receive inputs from two block-down-converted satellite signals 109 and one local terrestrial wireless broadcast signal (not shown). The multi-switch 108 provides four output terminals that can support up to four satellite receivers, or STBs 110, as shown.

The satellite receiver or STB 110 can include one or more of a de-scrambler or decryption module to unlock or otherwise provide access to media content offered by a satellite service provider. The STB 110 can include a tuner that responds to an input from a user that tunes the STB 110 to one of a number of available satellite service channels. In some instances, the block down-conversion of the LNB 107 provides multiple satellite service channels to each STB 110, allowing for selection of a particular channel to occur within the STB 110. A decoder decodes encoded channel signals, e.g., converting digital MPEG-2, H.264 or MPEG-4 signals to another format, such as analog NTCS format, HDTV format, and the like. It is understood that the down-converted RF signal can support multiple channels simultaneously, e.g., being distributed by the RF distribution network for processing by multiple satellite receivers.

In the illustrative embodiment, the system 100 also includes an intelligent multi-switch 116. The intelligent multi-switch 116 receives media content from one or more alternate sources 118 and selectively provides the alternative media content to one or more of the STBs 110. For example, the intelligent multi-switch 116 provides the alternative media content 118 to the STBs 110 during occurrences of interference that might otherwise degrade or prevent reception of the satellite signal 104. In some embodiments, the intelligent multi-switch 116 identifies alternate media content based on the particular media content being consumed or otherwise presented to the STBs 110. Indication of media content being presented to the STBs 110 can be determined from one or more of a channel indicator, an Electronic Programming Guide (EPG), a program recording schedule for STBs 110 that include Digital Video Recorders (DVR), and the like.

In some embodiments, the intelligent multi-switch 116 is IP enabled and has discrete signal detection that applies the content from a corresponding internet feed 118 (fed to IP multi-switch) and switches back to the satellite/terrestrial feed 109 when certain impairments come and go. Typically this type detection can be a signal frequency detector. The accuracy associated with the prediction of rain fade at one frequency based on the rain fade measured at another frequency is on the order of +/−2 dB. Thus effective fade detection requires fade measurements at only one frequency. However there are several detection methods to accomplish the switch, such as indication of a signal to noise ratio, a bit error rate, an error correction performance metric, and so forth.

Figure 2:
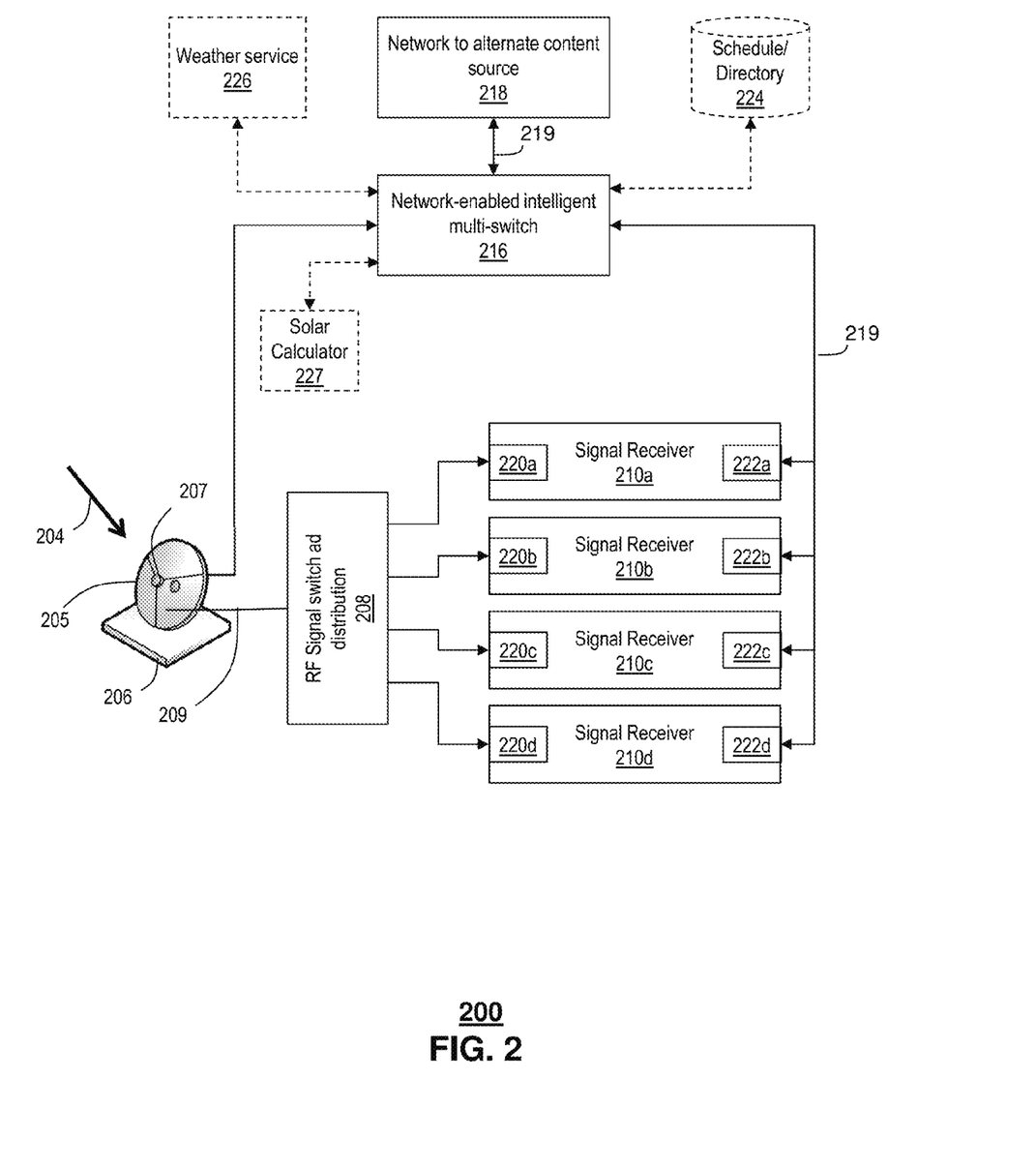
FIG. 2 depicts an illustrative embodiment of a terrestrial portion of the direct broadcast satellite system described in FIG. 1.

FIG. 2 depicts another embodiment of a terrestrial portion 200 of the direct broadcast satellite system 100 described in FIG. 1. The terrestrial portion 200 includes a satellite terminal 206 having a satellite dish antenna 205 and a low-noise amplifier/block down-converter (LNB) 207. The dish antenna 205 is typically mounted external to a subscriber's premises and receives RF signals 204 from one or more satellites. The received satellite signals 204 are passed to the LNB 207, where they are amplified, filtered and down-converted. The down-converted signals are provided to one or more STBs 210a, 210b, 210c, 210d (generally 210) of a subscriber's premises through an RF distribution network 208. The RF distribution network 208 can include one or more switches, one or more signal splitters, or a combination of one or more switch and one or more signal splitters, e.g., directing a particular RF output of the LNB 207 to one or more STBs 210.

The terrestrial portion 200 also includes an intelligent multi-switch 216. The intelligent multi-switch 216 is in communication with one or more of the STBs 210 and one or more network-accessible alternate content sources 218. Alternatively or in addition, the intelligent multi-switch 216 is in communication with one or more of a program schedule and/or service directory 224, a weather service 226 and a solar calculator 227. The STBs 210, in turn, include an RF input terminal 220a, 220b, 220c, 220d (generally 220), and a network interface 222a, 222b, 222c, 222d (generally 222). The RF input terminals 220 are in communication with the RF distribution network 208, receiving the down-converted RF signals from the LNB 207. The network interfaces 222 are in communication with the intelligent multi-switch 216, e.g., receiving alternative media content from one of the network-accessible alternate content sources 218. In some embodiments, the multi-switch 216 is in communication with one or more of the satellite terminal 206 and the RF distribution network 208.

In operation, any operational STBs 210 that are actively receiving satellite media content from the satellite signal 204, would be tuned to a channel associated with particular media content provided on that channel. It is generally understood that the satellite service media content can be provided in a broadcast mode, e.g., according to a program lineup or schedule. Under such conditions, the program lineup can be identified by an electronic program guide identifying channels, time slots and programmed media content. Accordingly, knowledge of a tuned channel and a time is sufficient to allow for an identification of a media content item being presented on display equipment attached to the STB 210 and/or recorded at a DVR. Alternatively or in addition, the satellite signal includes metadata that includes identifying information. Different metadata can be provided for each programmed channel of the satellite service lineup, such that access to metadata of a tuned channel can identify a media content being presented on the display equipment attached to the STB 210 and/or recorded at a DVR. It is also understood that in some embodiments, satellite service media content can be provided on a pay-per view basis and/or as an on demand basis.

The intelligent multi-switch 216 can identify what media content items are being delivered to any active STBs 210, and further identify alternative media content items. The alternative media content items can include, without limitation, other versions of the same media content items. For example, a direct broadcast satellite service provider may offer some or all of their channel lineups in an ancillary service for delivery over terrestrial networks. The ancillary service can include, so-called, small screen versions of the media content items, generally intended for consumption on mobile devices. Thus, a high-definition version, including ultra-high-definition or "4K" version of a media content item might be delivered by the satellite service according to the satellite signal 204; whereas, a standard definition, low-definition or otherwise small-screen version can be provided via a cable service and/or via an IP media stream.

The intelligent multi-switch 216 can identify an impairment in delivery of media content by way of the satellite signal 204, and in response, direct the alternative media content 219 to the STBs 210 by way of the network interface 222. The alternative media content can take the form of a packet stream, e.g., a media stream according to a streaming protocol, such as MPEG-2 or MPEG-4, MP-3, and the like. The media content and the alternative media content can include, without limitation, one or more of video content, audio content, data, text, images, and the like. In some embodiments, the media content can include social media content, gaming content, e.g., multiplayer including massively multiplayer games. It is also generally understood that any media content or alternative media content can include metadata that can include descriptive information about the media content item. Descriptive information can include, without limitation, a program identifier, a program title, a program source, e.g., studio, actors in the program, a genre, viewer and/or critical reviews, an industry standard rating, e.g., general audience, mature content, language, nudity, violence, start time, end time, duration, and the like.

The intelligent multi-switch 116 detects a particular channel to which one of the STBs 110 is tuned. The intelligent multi-switch 116 can include a clock, or otherwise obtain a local time, such that the media content item or program can be determined from the channel and the time with reference to the EPG.

The intelligent multi-switch 216 can identify an impairment as a complete loss of the satellite signal 204, a reduction in RF power of the satellite signal, e.g., due to a signal attenuation as might be experienced during heavy precipitation conditions. Alternatively or in addition, the impairment can be identified by an increase in a Bit Error Rate (BER) and/or a measure of error correction performance, e.g., an increase of forward error correction. Interjection by the multi-switch 216 to provide the alternative content to the STB 210, can occur in a reactionary manner, when the signal loss and/or error performance reaches or exceeds an intolerable level. Such scenarios might result in a loss of picture and/or audio, a reduced resolution, a blank screen, and the like. Alternatively or in addition, interjection by the multi-switch 216 can occur in a predictive manner in which a trend in performance can be used to predict a future loss of signal, or increase in error performance. Such predictions can be determined from one or more of trends of measured performance, weather sensory data, weather forecasts, and or predictions, e.g., from solar calculators to predict sun fades.

Weather data and/or weather forecasts can be obtained from a weather service provider, such as the National Weather Service, a local news outlet and/or weather application programs or apps', such as The Weather Channel®. The Weather Channel® is a registered trademark of The Weather Channel, Inc. In some embodiments, the weather information can be obtained from a local weather station or weather sensor, such as a rain gauge, a hydrometer, a barometer, or the like provided at the subscriber premises.

In some instances, the STB 210 provides an indicator that the signal loss/error performance is intolerable. This might include an application that flashes a billboard or similar message to presentation equipment indicating loss of signal and/or technical difficulties. Alternatively or in addition, one or more of the LNB 207 and the STB 210 provides a performance indicator related to the satellite signal 204 and or individual channels tuned to by the STBs 210. The signal indications can include Signal-to-Noise Ratio (SNR), BER, error corrections, and the like. The multi-switch 216 can be programmed or otherwise include logic to act upon such signal indications in order to determine when to switch between satellite service media content and any alternative media content. The programming and/or logic can implement one or more rules that determine aspects of any transitions, such as when and under what conditions to switch between the regular and alternate content. The rules can include further restrictions, such as allowed alternative content sources, blocked alternative content sources, user preferences, and the like.

It is understood that in at least some instances, the same programming content may not be available from other network sources depending on one or more of the program, the time, available sources, etc. In such instances, the multi-switch 216 can be configured to provide a suitable replacement alternative content item. Such suitable replacement content can be determined according to one or more of a genre, actor(s), producer, studio, rating, and the like. For example, if the multi-switch 216 determines that an STB 210 is tuned to a particular episode of "Modern Family," the multi-switch can search a schedule and/or directory 224 of alternate media content to identify a suitable replacement. The suitable replacement in the illustrative example might include another episode of "Modern Family." The other episode can be selected based on further detail, such as another episode from the same season, or close to the same season. Another episode dealing with similar subject matter, such as a story that focuses on one of the same actors can be selected, as well as other shows that may include the same actors, other family shows, and the like.

It is envisioned in at least some instances that suitable replacement content can include advertising content. The selection of any particular advertising content to be substituted during outages can be based on perceived user demographics based on the particular content tuned to by the STB 210 at the time of the outage. Alternatively or in addition, the selection of alternative content that includes advertising can be based on one or more of user preference, subscriber demographics, past viewing history, and the like.

In some embodiments, the multi-switch 216 includes a buffer, such as a circular buffer, that accepts a portion of the alternative content item. The buffer can be used to synchronize a transition between the particular media content item being presented at the STB 210 and the alternate content. For example, the buffer depth can be selected to store enough streamed media content to account for a greatest anticipated difference in timing between a satellite service presentation of a program, and a terrestrial service, "small-screen" presentation of the same show. Such delays can range from a few seconds, to tens of seconds, or more. The multi-switch can include circuitry and/or programming steps to detect or otherwise determine a time delay or time offset between the original and alternate media content items. The time delay or offset can be used to adjust the circular buffer such that alternate media content at an output of the circular buffer is approximately synchronized with the original media content presented to the STB 210. Having established synchronization, the multi-switch 216 can switch or otherwise instruct the STB 210 to switch between the original content item and the alternate content item. Such a switch can occur within the same frame, e.g., within the same "I frame" of an MPEG media stream.

Figure 3:
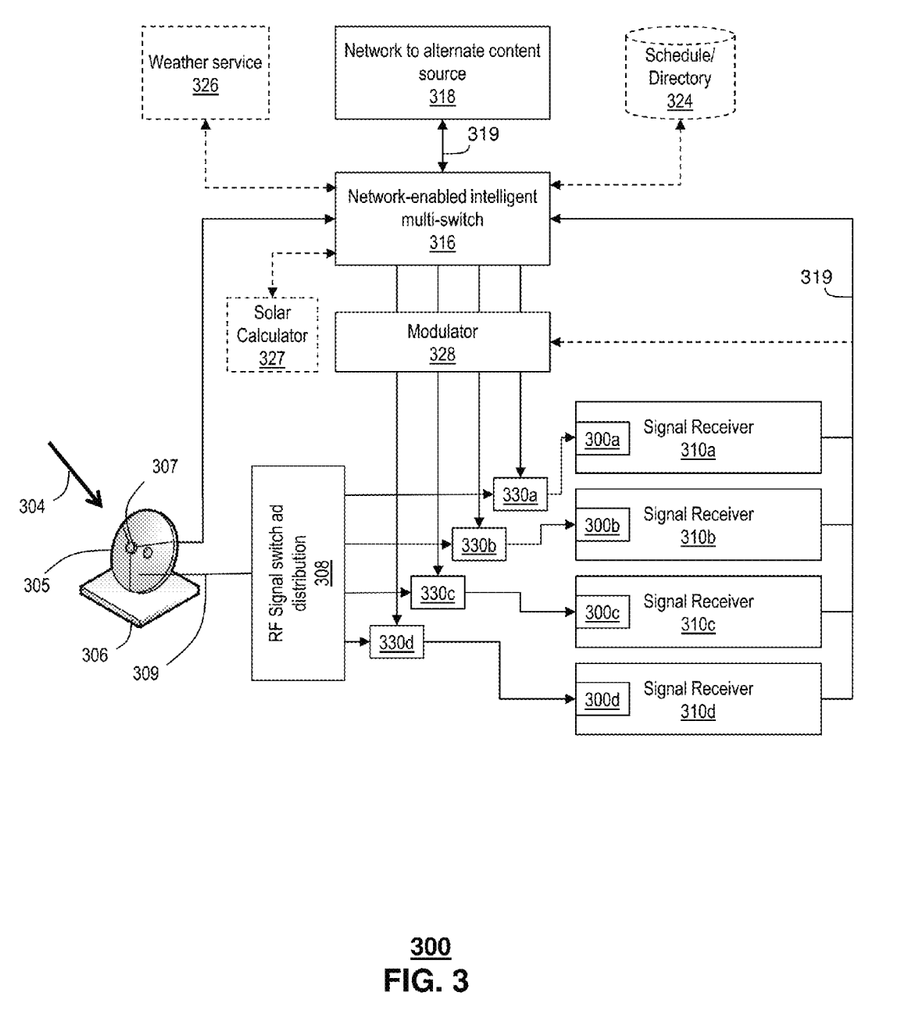
FIG. 3 depicts another illustrative embodiment of a terrestrial portion of the direct broadcast satellite system described in FIG. 1.

FIG. 3 depicts another embodiment of a terrestrial portion 300 of the direct broadcast satellite system 100 described in FIG. 1. The terrestrial portion 300 includes a satellite terminal 306 having a satellite dish antenna 305 and a low-noise amplifier/block down-converter (LNB) 307. The received satellite signals 304 are passed to the LNB 307, where they are amplified, filtered and down-converted. The down-converted signals are provided to one or more STBs 310a, 310b, 310c, 310d (generally 310) of a subscriber's premises through an RF distribution network 308. The terrestrial portion 300 also includes an intelligent multi-switch 316 in communication with one or more of the STBs 310 and one or more network-accessible alternate content sources 318. Alternatively or in addition, the intelligent multi-switch 316 is in communication with one or more of a program schedule and/or service directory 324, a weather service 326 and a solar calculator 327. The STBs 310, in turn, include an RF input terminal 320a, 320b, 320c, 320d (generally 320) that receive the down-converted satellite signals provided by the RF distribution network 308.

The system 300 also includes one or more modulators 328 and RF switches or signal combiners 330a, 330b, 330c, 330d (generally 330). The modulator 328 is in communication with the intelligent multi-switch 316 and the RF switches/combiners 330. In operation, the intelligent multi-switch 316 accesses alternate media content, e.g., as described above in relation to FIG. 2. The alternate media content can be packetized content, e.g., obtained from a network-accessible source. For example, the media content can be in the form of an IP multicast stream. The multicast stream can include "small-screen" versions of the satellite service media content items that may suffer an interruption in delivery. Alternatively or in addition, the multicast stream can include any of the other alternative media content disclosed herein.

The modulator 328 receives the multicast stream, or in some instances, an analog signal comprising the alternate media content. The modulator 328 modulates the alternate media content stream onto an RF signal that can replicate the RF output signal received from the LNB 307, by way of the RF distribution network 308. In this manner the RF modulated alternate media content can be directed to one or more of the STBs 310 during any outage periods in which the original satellite service content may be degraded or otherwise unavailable. In some embodiments, the modulator 328 or another device, such as a wireless modem (not shown) can provide the alternate content wirelessly to the STBs 310.

For applications in which the RF switches/combiners 330 include controllable switches, the switches 330 can receive a control signal, e.g., from the multi-switch and/or another control device to actuate a switch to the alternate content during an interruption to the satellite service and a switch back to the original content when the satellite service has been restored. In the illustrative embodiment, the intelligent multi-switch 316 obtains alternate content for each of the set-top boxes 310. Accordingly, the intelligent multi-switch 316 provides up to four IP streams (multicast or unicast for video on demand), to the modulator 328.

Although separate RF switches/combiners 330 are illustrated, it is understood that any switching to/from alternate media content could be accommodated by the RF distribution network 308. Namely, instead of a 1×4 RF switch, the RF distribution network 308 can include a 2×4 switch capable of switching either the satellite RF signal from the LNB 307 or the alternate media content RF signal from the modulator 328 to one or more of the STBs 310. Although the modulator 328 is illustrated as having four independent RF outputs, it is understood that the modulator can modulate multiple IP packet streams onto a single RF signal, e.g., with the alternate content occupying corresponding frequency spectra to the satellite RF signal content being replaced. In this manner, the STB 310 is able to process the original satellite media content or the alternate media content without having to retune.

Alternatively, in some embodiments, in which the down-converted RF satellite signal from the LNB 307 includes encryption or scrambling, it is understood that the modulator 328 can include an encryption and/or scrambling circuitry or program steps to encrypt and/or scramble the alternate content in the same manner as applied to the original down-converted RF satellite signal. Accordingly, the STB 310 can continue to process the alternate content in a like manner, including channel tuning, decryption and/or descrambling. In other embodiments, it is understood that the alternate content can be provided without encryption and/or scrambling, even though the original signal is encrypted and/or scrambled. In such instances, the STB 310 can be programmed to detect a change in encryption and/or scrambling of the signal and process the signal accordingly. A control signal indicating whether encryption and/or scrambling should be applied can be generated with the STB 310, e.g., upon a detection that the signal is/is not encrypted/scrambled. Alternatively or in addition, such a control signal could be provided to the STB by another device, such as the modulator 328, the multi-switch 316 or some other controlling device that is aware of switchover/switchback events to/from alternate media content. An example system comprising coordination of back-up media services is disclosed in U.S. Patent Application, entitled "System and Method for Coordinating Back-Up Services for Land Based Content Subscribers," having attorney docket no. 2015-0388_7785-1201, and assigned application Ser. No. 14/919,356, filed on Oct. 21, 2015, incorporated herein by reference in its entirety.

Figure 4:
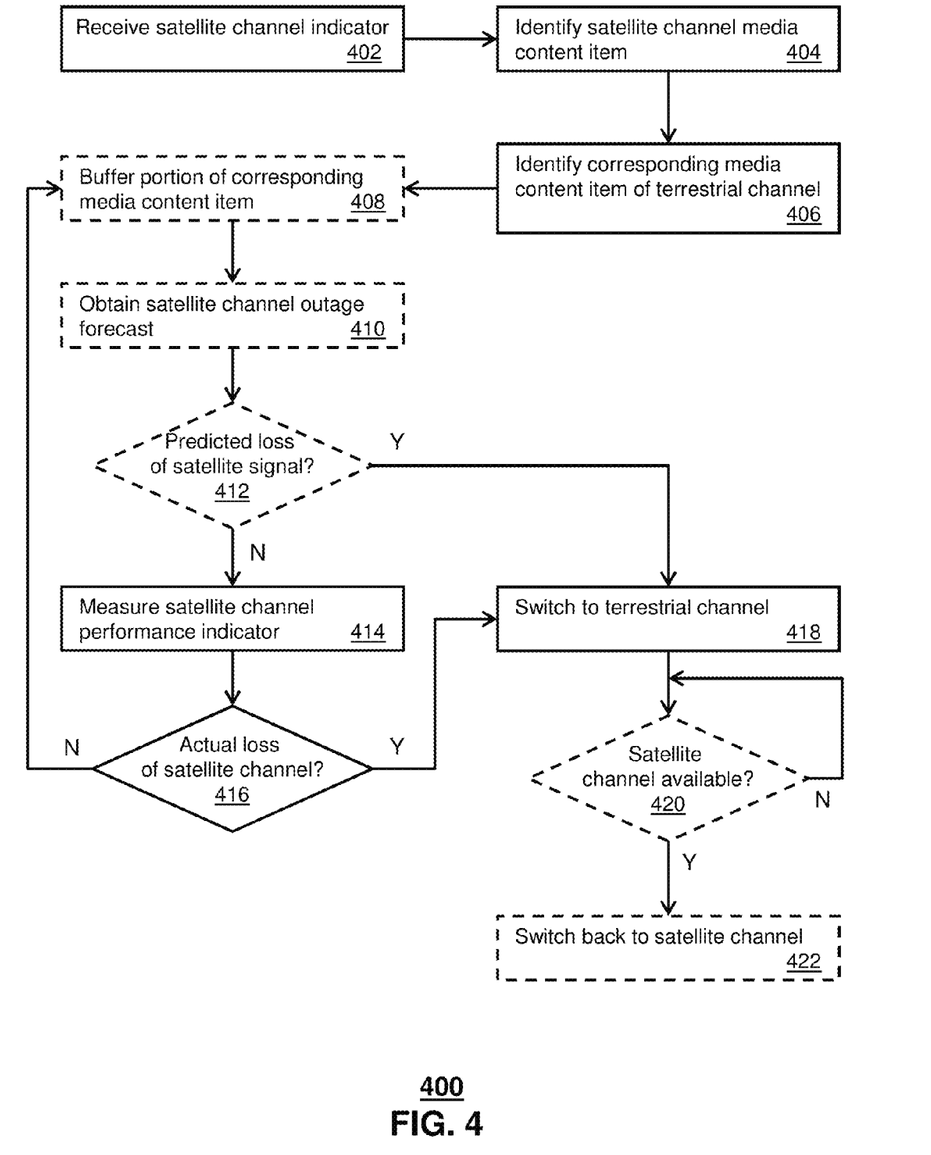
FIG. 4 depicts an illustrative embodiment of a method used in portions of the system described in FIGS. 1-3.

FIG. 4 depicts an illustrative embodiment of a process 400 used in portions of the system described in FIGS. 1-3. A satellite channel indicator is received at 402. The channel indicator can include a tuning status or channel indicator provided by the STB 110, 210, 310, and/or by a remote control that operates user equipment, e.g., including the STBs. Alternatively or in addition, the satellite channel indicator can be determined by a detecting a frequency or channel of a particular transponder to which the STB is tuned to. For applications, e.g., when backing up a DVR, the tuning status can be obtained from a pre-programmed recording schedule that can include channel names, frequencies, times, and the like.

A satellite channel media content item is identified at 404. A particular media content item being watched or otherwise presented or recorded on user equipment, can be identified by any of the techniques disclosed herein, including reference to an EPG based on the tuning status/channel and local time, metadata associated or otherwise provided with the media content item, and in some instances, by sampling the media content item itself. A sampling of images, textual content, and/or audio of the original media content item can be obtained and used for identification purposes.

A corresponding media content item of terrestrial channel is identified at 406. Generally, the system knows which primary service has been subscribed to for a given premises. For instances in which a companion service is available, such as the so-called "small screen" or mobile versions of a given service are available, these services can be identified as a source for corresponding or alternate media content items. In other instances, particular broadcast program might also be available as an on-demand content item. In such instances, the on-demand version can be identified as a source of a corresponding or alternate media content item. If on-demand content is used, an offset can be monitored or otherwise provided, e.g., as a pointer to a portion of the content item being presented at the time of an outage. The offset can be used to adjust download and/or playback of the on-demand content item to synchronize a transition from the broadcast to the on-demand content item in the event of an interruption.

As disclosed herein, alternative content can be identified, e.g., if corresponding version of the same content is not available. The alternative content can be identified by relationships of one or more parameters to the original content item. Such parameters can include title, characters, actors, musical scores, genre, author, producer, studio, ratings, and the like.

A satellite channel performance indicator is measured or otherwise received at 414. The satellite performance indicator can include one or more of a signal strength of the received satellite signal, a signal to noise ratio of the received signal or the down-converted signal at the LNB, and/or some other measure of performance, such as a BER, error correction performance factor and the like.

A determination is made at 416 as to whether an impairment to satellite channel has occurred. To the extent it is determined that an impairment, e.g., a loss of signal, has occurred, a switch to the alternate content, e.g., terrestrial channel, occurs at 418. Otherwise, the performance indicator continues at 414, until such time as a signal impairment is detected, if at all.

In some embodiments, a satellite channel outage forecast is obtained at 410 (shown in phantom). The forecast can include results of a solar conjunction calculation, and or a weather forecast based on locations of the satellite terminal and the corresponding satellite. It is understood that forecast can include identification of regularly scheduled maintenance, and the like. It is understood that, in some embodiments, a prediction of a loss of satellite signal can be obtained at 412 (shown in phantom). To the extent that a loss or impairment of the satellite signal is determined at 412, a switch to the alternate content occurs at 418. Otherwise, the process continues at 414, monitoring channel performance and reacting at 416 as appropriate.

In some embodiments, a portion of the corresponding media content item is buffered at 408 (shown in phantom). The buffering can be accomplished, as disclosed herein, to support a synchronization during a switch between original and alternate media content. It is understood that the buffering can be applied continuously, e.g., according to a circular buffer, such that the alternative content is available to respond to an unexpected signal outage. Alternatively, the buffering can be applied in anticipation of a scheduled and/or predicted outage. During period when an outage is not expected, there would be no need to obtain the alternate content, thereby preserving network resources.

In some embodiments, a determination is made at 420 (shown in phantom) as to whether the original satellite channel available at 420. To the extent it is determined that the original satellite channel is available, a switch back to the original satellite channel occurs at 422.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
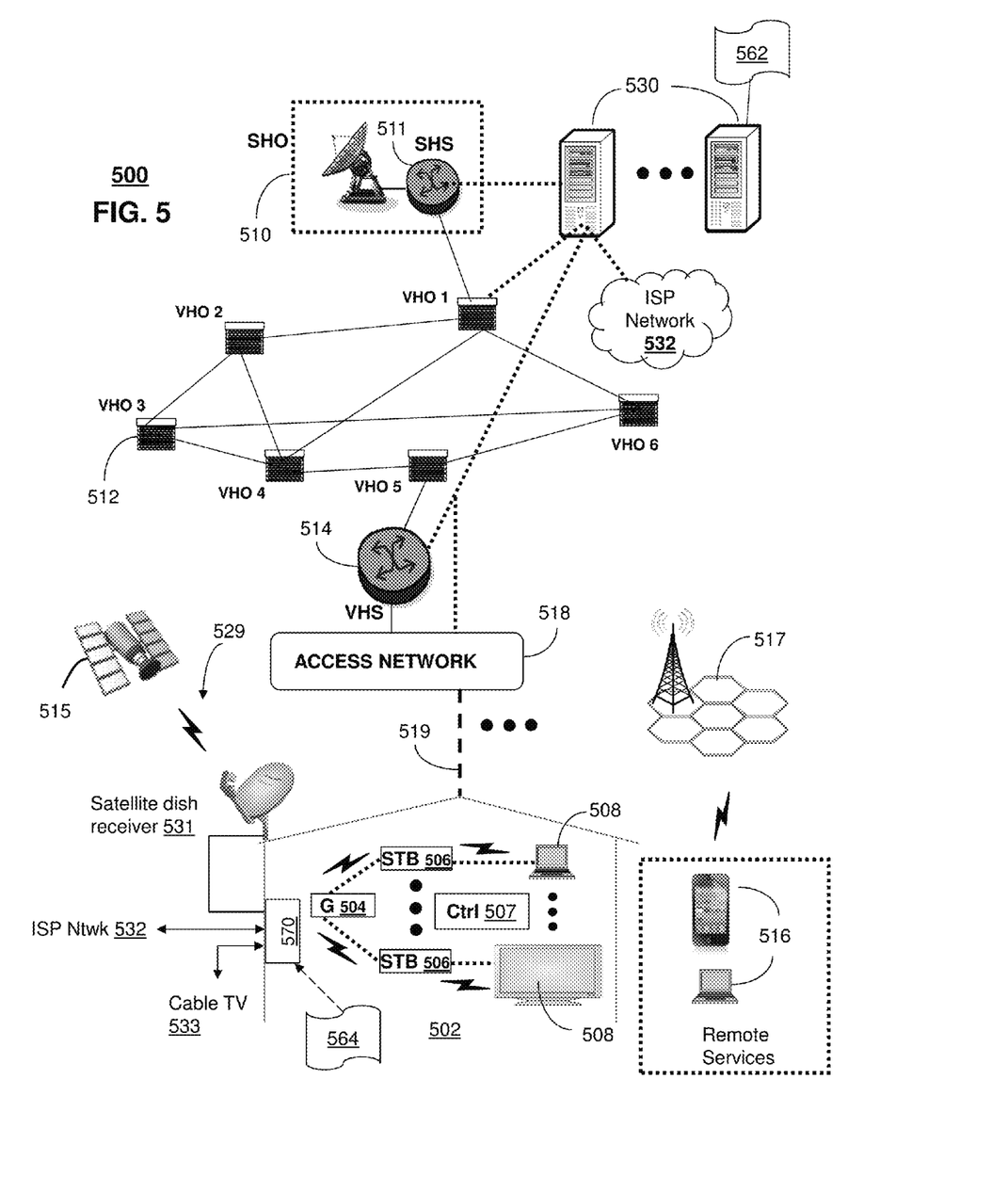
FIG. 5 depicts an illustrative embodiment of a communication system that supports replacement media content to the direct broadcast satellite system of FIGS. 1-3.

FIG. 5 depicts an illustrative embodiment of a first communication system 500 for delivering media content. The communication system 500 can represent an Internet Protocol Television (IPTV) media system. Communication system 500 can be overlaid or operably coupled with the satellite communication systems 100, 200, 300 of FIGS. 1, 2 and/or 3 as another representative embodiment of communication system 500. For instance, one or more devices illustrated in the communication system 500 of FIG. 5 can determine a first tuning state of a STB 506. The first tuning state includes a satellite service channel of a number of channels, including a first media content item that is processed by the STB 506 for presentation to equipment a subscriber 508. A terrestrial service channel is identified, for example by the intelligent multi-switch 570 and/or by the backup service server 530 that includes a second media content item. The terrestrial service channel is accessed by the intelligent multi-switch after not having been initially processed by the STB 506 for presentation to the equipment 208 of the subscriber. An unavailability is determined of the satellite service channel to the media processor, e.g., by the intelligent multi-switch 570 and/or by the backup service server 530 and the second media content item is provided to the STB 506 in place of the first, responsive to the determining of the unavailability of the satellite service channel.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516. In some embodiments the computing devices 530 include a backup service server 530 that is programmed to implement server backup service functionality 562. The server backup service functionality 562 can implement one or more of the features disclosed herein, such as the features associated with the process 400 described in FIG. 4. The backup service server 530 can operate alone or in combination with the intelligent multi-switch 570. Accordingly, the intelligent multi-switch 570 is programmed to implement switch backup service functionality 564. The switch backup service functionality 564 can implement one or more of the features disclosed herein, such as the features associated with the process 400 described in FIG. 4. When both the backup service server 530 and the intelligent multi-switch 570 are provided, backup service functionality can be shared or otherwise distributed across both devices 530, 570. It is envisioned that in some embodiments, backup service functionality can be included in one or more other devices and systems, such as the satellite receiver 531, the STB 507, the residential gateway 504, and the like.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
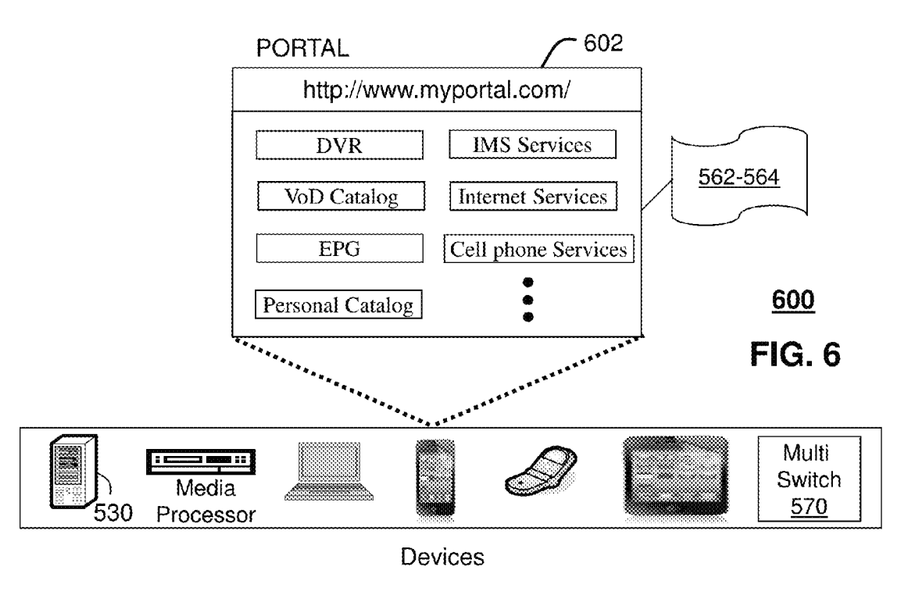
FIG. 6 depicts an illustrative embodiment of a web portal for interacting with the communication systems of FIGS. 1-3.

FIG. 6 depicts an illustrative embodiment of a web portal 602 of a communication system 600. Communication system 600 can be overlaid or operably coupled with systems 100, 200, 300 of FIGS. 1, 2 and/or 3 and/or communication system 500 as another representative embodiment of systems 100, 200, 300 of FIGS. 1, 2 and/or 3 and/or communication system 500. The web portal 602 can be used for managing services of systems 100, 200, 300 of FIGS. 1, 2 and/or 3 and communication systems 500. A web page of the web portal 602 can be accessed by a Uniform Resource Locator (URL) with an Internet browser using an Internet-capable communication device such as those described in FIGS. 1, 2 and/or 3 and FIG. 5. The web portal 602 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 602 can further be utilized to manage and provision software applications 562-564 to adapt these applications as may be desired by subscribers and/or service providers of systems 100, 200, 300 of FIGS. 1, 2 and/or 3, and communication system 500. For instance, users of the services provided by intelligent multi-switches 116, 216, 316, 570 and/or server 530 can log into their online accounts and multi-switches 116, 216, 316, 570 and/or server 530 with features that a user may want to program such as loss of signal triggers, alternate content preferences, user identity and/or account information, user profiles, providing contact information to server to enable it to communication with the STBs 110, 210, 310, 506 described in FIGS. 1-3 and 5, and so on. Service providers can log onto an administrator account to provision, monitor and/or maintain the systems 100, 200, 300 of FIGS. 1, 2 and/or 3 or server 530.

Figure 7:
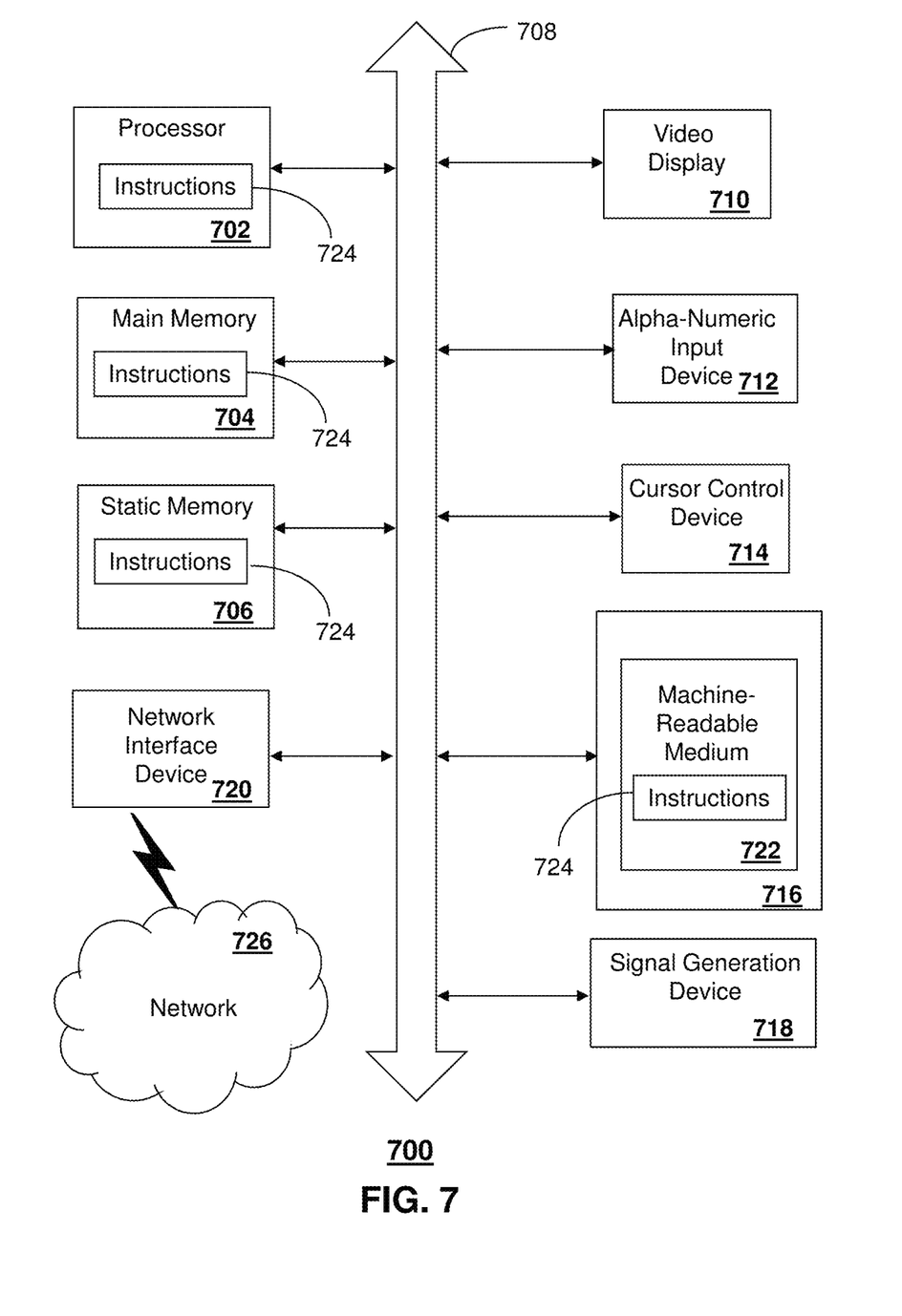
FIG. 7 is a diagrammatic representation of a machine in the form of a computer system within which a set of instructions, when executed, may cause the machine to perform any one or more of the methods described herein.

FIG. 7 depicts an illustrative embodiment of a communication device 700. Communication device 700 can serve in whole or in part as an illustrative embodiment of the devices depicted in systems 100, 200, 300 of FIGS. 1, 2 and/or 3, and FIG. 5 and can be configured to perform portions of the process 400 of FIG. 4.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

Upon reviewing the aforementioned embodiments, it would be evident to an artisan with ordinary skill in the art that said embodiments can be modified, reduced, or enhanced without departing from the scope of the claims described below. For example, the content replacement techniques disclosed herein for DBS satellite service can be applied to other services, as well, including terrestrial services. Outages experienced in such services can be detected and/or predicted and backed up in a similar manner. That is, an intelligent switch can be provided, e.g., at customer premises, or at some other location upstream, such as at a DSLAM, VRAD, central office, or even a head end. The intelligent switch, in response to a loss of signal and/or loss of content, can provide alternate content according to the techniques disclosed herein. Consider, for example, a cable service, or other terrestrial service, such as FiOS or U-Verse that experiences a loss of signal and/or content. Substitute content obtained from an Internet version of the service, e.g., providing the same or comparable channel lineup, and provided to subscriber equipment during the detected outage. Alternatively or in addition, alternative or replacement content can be obtained from subscribe premises equipment, such as a DVR. Other alternate of replacement content can include alerts, such as weather alerts and/or emergency broadcast network content that may or may not relate to an outage being experienced. Other embodiments can be used in the subject disclosure.

In some embodiments, it is envisioned that one satellite service can be replaced with another satellite service. Such substitutions can be available for installations having multiple satellite terminals, e.g., pointing to different satellites at different orbital positions. Thus, when one satellite terminal may be experiencing a solar fade associated with a first satellite, the other satellite terminal may not be experiencing a solar fade, thus being available for service. Without limitation, transponder resources of the two different satellites may be providing satellite services of the same satellite service provider, different providers, or both. For situations in which substitute media is obtained from a different service provider, it is understood that such substitutions may require agreements for temporary provisioning of services, authorizations, assessments of fees, billing, etc.

In some embodiments, it is envisioned that one satellite service can be replaced with another satellite service of the same satellite. For example, a satellite terminal might include one dish antenna equipped with multiple feeds. The feeds can be distinguished by one or more of polarizations, frequency bands, focal positions, and the like. Consider services provided at a first frequency band and/or polarization that might be impacted by a weather event, such as precipitation. To the extent that the other service operates at a different frequency band and/or polarization, the other service may not be impacted by the same weather event, such that it would be available as a replacement. It is also understood that one dish antenna can include multiple feeds positioned at different focal locations that can point to different satellites. Accordingly, an interruption of service from one of the feeds of a first satellite can be replaced by service from another feed of another satellite. Once again, such substitutions may require agreements for temporary provisioning of services, authorizations, assessments of fees, billing, etc.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the intelligent multi-switch 116, 216, 316, 570 the STB 110, 21, 310, 506, the residential gateway 570, the schedule/directory 224, 324, the weather service 226, 326, the backup service server 530, the media processor 506 and other devices of FIGS. 1-3 and 5-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a switch;
   a buffer memory;
   a processor in communication with the switch and the buffer memory; and
   a memory that stores executable instructions that, when executed by the processor, facilitate performance of operations, comprising:
      receiving a channel indicator of a media processing device of a subscriber, wherein the channel indicator corresponds to a satellite service channel of a plurality of satellite service channels, wherein the satellite service channel provides a first version of a media content item, wherein the first version of the media content item is processed by the media processing device for presentation;
      identifying a terrestrial service channel of a plurality of terrestrial service channels providing a second version of the media content item;
      detecting an unavailability of the satellite service channel to the media processing device;
      controlling the switch to the terrestrial service channel of the plurality of terrestrial service channels, wherein the second version of the media content item is not, prior to the controlling of the switch, processed by the media processing device for presentation;
      buffering a portion of the second version of the media content item to obtain a buffered second version within the buffer memory; and
      facilitating subsequent processing of the second version of the media content item by the media processing device by replacing the first version, responsive to the detecting of the unavailability of the satellite service channel, wherein the replacing the second version of the media content item comprises providing the buffered second version in place of the first version of the media content item.

2. The system of claim 1, wherein the detecting the unavailability is based on a bit error rate, a signal-to-noise ratio correction, or a combination thereof.

3. The system of claim 2, wherein the operations further comprise:
   determining a relative delay between a presentation of the first version of the media content item and a scheduled presentation of the second version of the media content item; and
   determining a buffer depth based on the relative delay, wherein a transition at the media processing device from the first version to the buffered second version occurs synchronously.

4. The system of claim 1, wherein the identifying of the terrestrial service channel comprises:
   identifying the first version of the media content item based on the channel indicator and a scheduled presentation time.

5. The system of claim 1, wherein the detecting of the unavailability is based on a performance measure of a satellite signal comprising the plurality of satellite service channels, wherein the performance measure comprises an effective isotropic radiated power, a bit error rate, a signal-to-noise ratio, a measure of error correction or a combination thereof.

6. The system of claim 1, wherein the operations further comprise:
   determining a re-availability of the satellite service channel to the media processing device of the subscriber, after the determining of the unavailability of the satellite service channel to the media processing device of the subscriber; and
   providing the first version of the media content item to the media processing device in place of the second version of the media content item, responsive to the determining of the re-availability of the satellite service channel.

7. The system of claim 1, wherein the operations further comprise predicting the unavailability of the satellite service channel at a future time based on a weather forecast or a solar fade evaluation, wherein the identifying of the terrestrial service channel and the controlling of the switch are responsive to the predicting of the unavailability.

8. A method, comprising:
   detecting, by a device comprising a processor, a first tuning state of a media processing device of a subscriber, wherein the first tuning state comprises a satellite service channel of a plurality of satellite service channels, wherein the satellite service channel presents a media content item, wherein the media content item is presented to the media processing device;
   determining, by the device, a terrestrial service channel of a plurality of terrestrial service channels providing a substitute media content item;
   accessing, by the device, the terrestrial service channel of the plurality of terrestrial service channels;
   detecting, by the device, an unavailability of the satellite service channel for presentation to the media processing device;
   facilitating, by the device, subsequent processing of the substitute media content item by replacing the media content item, responsive to the detecting of the unavailability of the satellite service channel;

determining, by the device, a re-availability of the satellite service channel to the media processing device of the subscriber, after the determining of the unavailability of the satellite service channel to the media processing device of the subscriber; and providing, by the device, the media content item to the media processing device in place of the substitute media content item, responsive to the determining of the re-availability of the satellite service channel.

9. The method of claim 8, further comprising buffering, by the device, a portion of the substitute media content item within a buffer memory to obtain a buffered substitute media content item, wherein the providing of the substitute media content item comprises providing the buffered substitute media content item.

10. The method of claim 9, further comprising:
determining, by the device, a relative delay between the presentation of the media content item and a scheduled presentation of the substitute media content item; and
determining, by the device, a buffer depth based on the relative delay, wherein a transition at the media processing device from the media content item to the substitute media content item occurs synchronously.

11. The method of claim 8, wherein the media content item is streamed according to a first protocol, and wherein the substitute media content item is streamed according to a second protocol.

12. The method of claim 8, wherein the determining of the unavailability is based on a performance measure of a satellite signal comprising the plurality of satellite service channels, wherein the performance measure comprises an effective isotropic radiated power, a bit error rate, a signal-to-noise ratio, a measure of error correction or a combination thereof.

13. The method of claim 8, wherein the detecting the unavailability is based on a bit error rate, a signal-to-noise ratio, or a combination thereof.

14. The method of claim 8, further comprising predicting, by the device, the unavailability of the satellite service channel at a future time based on a weather forecast or a solar fade evaluation, wherein the determining of the terrestrial service channel and the accessing of the terrestrial service channel of the plurality of terrestrial service channels, are responsive to the predicting of the unavailability.

15. A non-transitory machine-readable storage medium, comprising executable instructions that, when executed by a processor, facilitate performance of operations, comprising:
determining a first tuning state of a media processing device of a subscriber, wherein the first tuning state comprises a satellite service channel of a plurality of satellite service channels, wherein the satellite service channel provides a first media content item, wherein the first media content item is processed by the media processing device for presentation;
identifying a terrestrial service channel of a plurality of terrestrial service channels provides a second media content item;
accessing the terrestrial service channel of the plurality of terrestrial service channels, wherein the second media content item is not processed by the media processing device for presentation;
determining an unavailability of the satellite service channel to the media processing device;
buffering a portion of the second media content item to obtain a buffered second media content item; and
facilitating subsequent processing of the second media content item by the media processing device by replacing the first media content item, responsive to the determining of the unavailability of the satellite service channel, wherein the facilitating of the subsequent processing of the second media content item comprises replacing the first media content item with the buffered second media content item.

16. The non-transitory machine-readable storage medium of claim 15, wherein the determining the unavailability is based on a bit error rate, a signal-to-noise ratio, or a combination thereof.

17. The non-transitory machine-readable storage medium of claim 16, wherein the operations further comprise:
determining a relative delay between a presentation of the first media content item and a scheduled presentation of the second media content item; and
determining a buffer depth based on the relative delay, wherein a transition at the media processing device from the first media content item to the buffered second media content item occurs synchronously.

18. The non-transitory machine-readable storage medium of claim 15, wherein the determining of the unavailability is based on a performance measure of a satellite signal comprising the plurality of satellite service channels, wherein the performance measure comprises an effective isotropic radiated power, a bit error rate, a signal-to-noise ratio, a measure of error correction or a combination thereof.

19. The non-transitory machine-readable storage medium of claim 15, wherein the operations further comprise:
determining a re-availability of the satellite service channel to the media processing device, after the determining of the unavailability of the satellite service channel to the media processing device; and
facilitating a replacing of the second media content item with the first media content item to the media processing device, responsive to the determining of the re-availability of the satellite service channel.

20. The non-transitory machine-readable storage medium of claim 15, wherein the operations further comprise predicting the unavailability of the satellite service channel at a future time based on a weather observation or a celestial calculation, wherein the identifying of the terrestrial service channel and the accessing of the terrestrial service channel of the plurality of terrestrial service channels, are responsive to the predicting of the unavailability.

* * * * *